Feb. 5, 1924.  1,482,959
C. L. T. ABALSAMO
SCALE
Filed Aug. 18, 1922  2 Sheets-Sheet 1
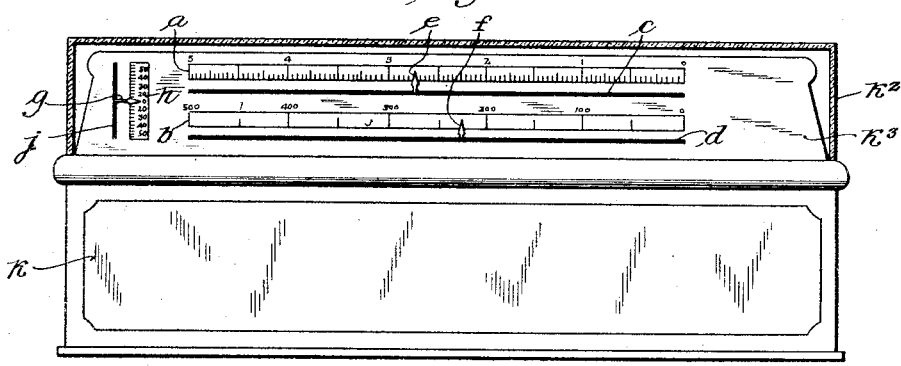
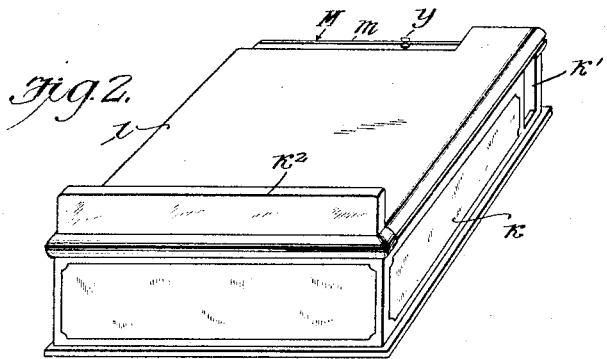
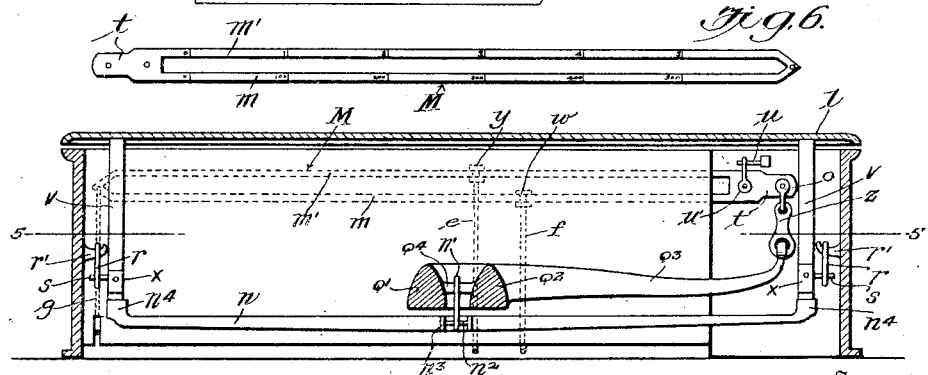
Inventor
Carlos Luis Tomás Abalsamo,
By
Attorney

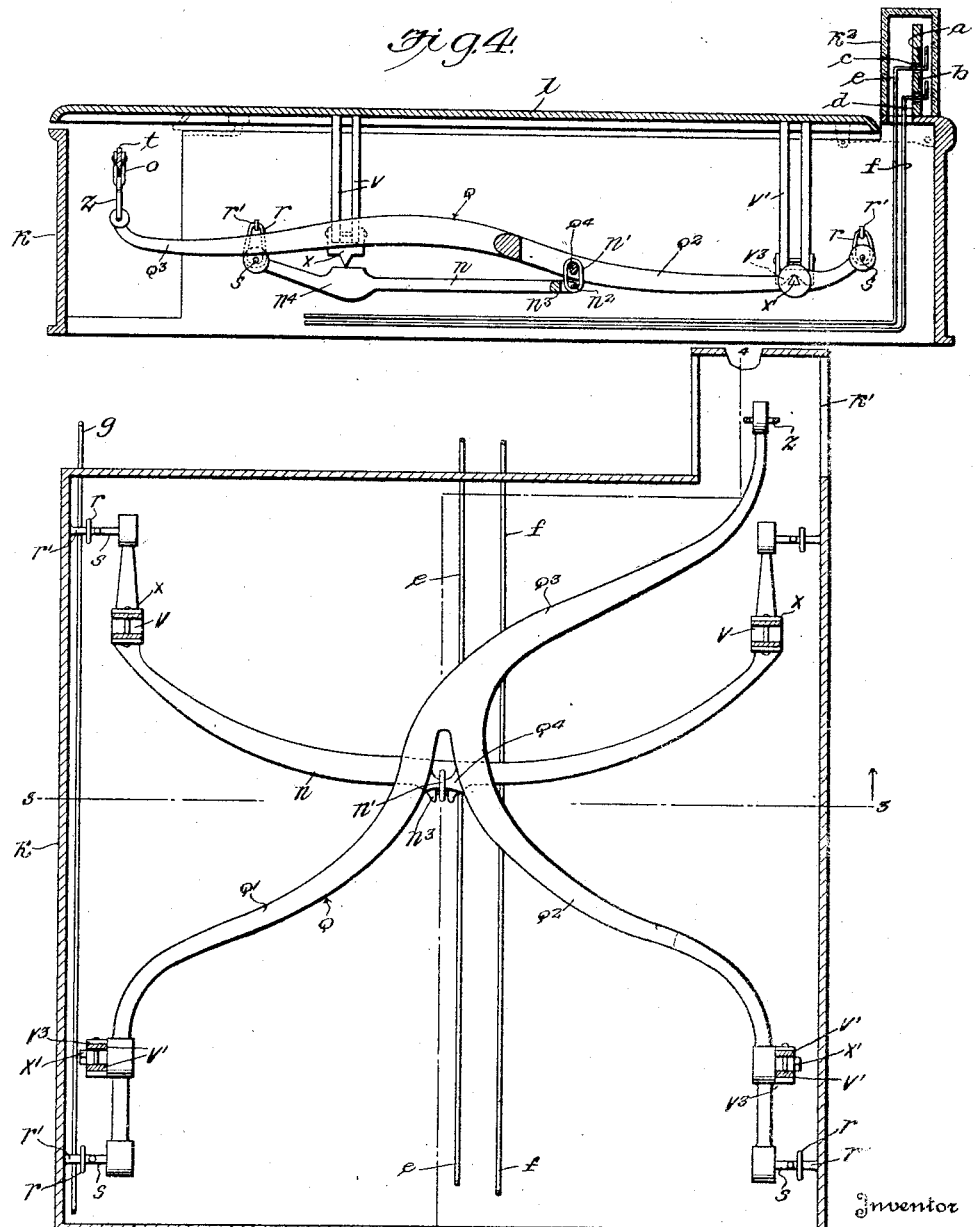

Patented Feb. 5, 1924.

1,482,959

UNITED STATES PATENT OFFICE.

CARLOS LUIS TOMÁS ABÁLSAMO, OF BUENOS AIRES, ARGENTINA.

SCALE.

Application filed August 18, 1922. Serial No. 582,720.

*To all whom it may concern:*

Be it known that I, CARLOS LUIS TOMÁS ABÁLSAMO, citizen of the Republic of Argentina, residing at 1783 Pueywedon Street, Buenos Aires, Argentina, have invented certain new and useful Improvements in Scales, of which the following is a specification.

This invention relates to improvements in scales, its object being to provide a small counterbalance scale in which any weight from one gramme to the capacity of the scale may be exactly weighed.

The main feature of the invention is the accuracy in the weighing operation which may be made so exact that no difference, even of one gramme, may occur, which has not been possible hitherto in the scales in use, referring naturally to those used generally on the counters of shops and the like. Furthermore, the buyer can satisfy himself that he is obtaining the correct weight, as the number of grammes in excess of, or lacking from, the correct weight is always indicated; and since all of the indicators are visible at all times, he can likewise satisfy himself that the equilibrium of the beam is not disturbed.

The accompanying drawings illustrate an embodiment of the invention which may be considered for all present purposes as the one preferred; but it is to be understood that such embodiment is susceptible of modifications and changes within its scope as hereinafter claimed.

In said drawings:

Figure 1 is a front elevation of the embodiment referred to.

Fig. 2 is a perspective view thereof.

Fig. 3 is a central transverse section, taken on line 3—3, Fig. 5.

Fig. 4 is a longitudinal vertical section on line 4—4, Fig. 5.

Fig. 5 is a horizontal section on line 5—5, Fig. 3.

Fig. 6 is an elevation of the beam.

Referring more particularly to the drawings, the scale comprises a casing or frame $k$ of substantially rectangular shape, open at top and bottom and having a rectangular projection or extension $k'$ at one of its rear corners, in this instance the right-hand corner, which extension is left open at its inner side to provide for the mounting and arrangement of the balance beam M, as hereinafter described. The casing $k$ is designed to rest at its bottom upon the shop counter or other suitable support, and it carries at its front end a glass indicator casing $k^2$, likewise subsequently described. A platform $l$ is disposed above and closes the top of the casing $k$ and conforms to the shape thereof in that it is extended at its rear right-hand corner so as to overlie the casing extension $k'$; said platform terminating at its front end just short of the glass indicator casing $k^2$.

The scale mechanism is located within the casing $k$ and comprises two main levers generally designated $q$ and $n$ and disposed one above the other. The upper lever $q$ consists of three arms connected integrally together at the center of the lever; the two front arms $q'$ and $q^2$ being symmetrically curved and arranged in respect of the longitudinal center line of the casing, while the single rear arm $q^3$ is curved rearwardly and towards the right and projects at its free end into the casing extension $k'$. The arms $q'$ and $q^2$ branch or fork from the rear arm $q^3$ and are connected adjacent their inner or rear ends by a narrow bridge-piece $q^4$; and from this bridge there is suspended a ring or link $n'$ which supports at its bottom a cross-pin $n^2$ mounted in a central fork $n^3$ on the lower lever $n$.

The front arms $q'$ and $q^2$ of the upper lever are supported at their free ends by means of hooks $r'$ which are set horizontally into the side walls of the casing $k$ and from which are suspended elongated rings or links $r$; these links $r$ providing rests on which are seated the projecting outer ends of lateral supporting pins $s$ fixed to the aforesaid ends of the lever arms. A suspension mounting is also provided for the free end of the rear arm $q^3$; but in this case, said arm end has connected to it a suspension link $z$ which is hung from a depending U-shape clip $o$ pivoted to the end portion or stem $t$ of the balance beam M. The end portion or stem $t$ carries a second U-shaped clip $u'$ (in this case, inverted) which is pivotally connected to it a slight distance to the left of the clip $o$ (Fig. 3); and said clip $u'$ is suspended from a pin $u$ which is suitably fixed to one of the walls of the extension $k'$ of the casing $k$, so that the clip and pin thus constitute the fulcrum about which beam M is adapted to rock, while the other clip $o$ provides the transmission connection between the beam and the lever system.

The lower lever $n$ takes the form of a single curved arm which extends transversely across the casing and is connected at its center to the upper lever $q$ by the above-mentioned ring or link $n'$. The ends of lever $n$ have a suspension mounting comprising hooks $r'$, links $r$ and lateral supporting pins $s$ identical with those previously described in connection with the mounting of the upper lever.

The lever system is operated by the depression of the platform $l$ consequent upon the imposition thereon of the article or substance to be weighed. To effect this operation, the platform has fixed to its under side a series of depending rods or fingers $v'$ and $v$ which coact, respectively, with the front portions of the lever arms $q'$ and $q^2$ and the rear or end portions of lever $n$. A pair of fingers $v'$ and a pair of fingers $v$ are arranged at adjacent each side edge of the platform; and to the lower edge of each front pair $v'$ is attached a notched bearing-piece $v^3$ for engagement by a knife bearing $x'$ which projects laterally from the front portion of the corresponding lever arm $q'$ or $q^2$. Each rear pair of fingers $v$ carries at its lower end a knife-edge bearing-piece $x$ which rests upon an enlarged and flattened part $n^4$ provided upon the adjacent end portion of lever $n$.

In consequence of this arrangement, the weight imposed upon the platform will press the latter downward, and this pressure will be transmitted through the fingers or rods $v'$ to the arms $q'$ and $q^2$ of the upper lever $q$, and through the fingers or rods $v$ to the end portions of the lower lever $n$; the result being that both levers have a downward swinging movement imparted to them, each lever swinging about its suspension mounting $r'$—$r$—$s$ as a fulcrum. The upper lever $q$, in moving downward, exerts a downward pull upon the parts $z$ and $o$ (Figs. 3 and 4) which connect it with the extreme end of the stem $t$ of the balance beam M, with the result that the latter is caused to rock about its fulcrum $u'$—$u$, its free lower end moving upward. The various parts are thereafter restored to normal position by the beam, which automatically returns to normal position, due to its own weight, as soon as the material to be weighed is removed from the platform; and it may be stated in this connection that the parts are so proportioned relatively to one another as to enable them to effect the requisite differences in the extents of their respective movements, as will be understood.

The indicating mechanism employed preferably comprises a plurality of graduated scale members disposed within the glass casing $k^2$, and an individual indicator for each scale. Referring to Fig. 1, it will be observed that there are two horizontal scale bars $a$ and $b$ arranged in spaced, superposed relation, and a relatively small vertical scale bar or member $h$ at one end thereof, all mounted in a vertical support or post $k^3$ located within casing $k^2$. These scale bars or members have indicators $e$, $f$ and $g$ respectively related to them; the outer end portions of said indicators projecting through slots $c$, $d$ and $j$ and terminating in arrow-shaped pointers which travel along the corresponding scale members. The slots referred to are formed through the support $k^3$ in juxtaposition to and parallel with the scale members, and are coextensive with the same. The upper scale member $a$ is utilized for weight in kilogrammes, and the lower scale member for weight in grammes, while the short vertical scale $h$ is the "exact weight" scale and is used to indicate the precise number of grammes that the material being weighed either falls short of or exceeds the particular weight for which the beam has been set.

With this system of indicators, a special form of balance beam is employed, such beam M comprising spaced, parallel upper and lower members $m'$ and $m$, connected at one end by the solid stem portion $t$ and joined to each other at the other end to form a V or point; (see Figs. 3 and 6). The lower beam member $m$ is graduated in grammes to correspond to the lower scale bar $b$, and it is to this member $m$ that the rear end of the indicator $f$ is connected through the medium of a sliding weight $w$. The upper beam member $m'$ is graduated in kilogrammes to correspond with the upper scale bar $a$ and carries a sliding weight $y$ to which the rear end of the indicator $e$ is attached. Hence, the adjustment of the weights $y$ and $w$ along the respective members of the beam will correspondingly shift the indicators $e$ and $f$, thereby causing their pointer terminals to travel along the scale bars $a$ and $b$. Both indicators $e$ and $f$ are disposed longitudinally of the casing $k$ and in parallel relation to the side walls thereof and to each other; and each of them has the form of an elongated U, the bottom portion of which is disposed below the lever system and projects rearwardly beneath the lower edge of the rear wall of the casing which is cut away or slotted for that purpose, so that the vertical rear member or arm of the indicator is located exteriorly of the casing. The beam M likewise has almost its entire slotted portion situated outside and in rear of the casing, its solid stem portion $t$ and its suspension mounting alone being disposed within the rearwardly-projecting extension $k'$, the inner side wall of which is either partly or wholly removed.

The indicator $g$ which coacts with the exact-weight scale $h$ is also U-shaped, and its rear arm is disposed exteriorly of the casing and is attached at its upper end to the pointed outer or free end of the beam; its bottom member is likewise disposed below the plane of the lever system. When the beam M is in horizontal position, which is of course its normal, unloaded position, the pointer on the end of the indicator $g$ is disposed opposite the zero mark on scale $h$; it being assumed that both weights $y$ and $w$ are at zero position on the beam members $m'$ and $m$ and, consequently, that the pointers on the ends of the indicators $e$ and $f$ are opposite the zero marks on the scale bars $a$ and $b$. If, now, the scale is to be set for a weight of 1 kilogramme, the weight $w$ is shifted to indicate that amount on the beam member $m'$, its pointer indicating the same amount on the front scale $a$. This adjustment has the effect of lowering the beam, which, in turn, causes a downward movement of the pointer $g$ along the exact-weight scale $h$. The material to be weighed is then deposited on the platform $l$, which is thereby depressed and, in turn operates the lever system; the result being that the beam is caused to move upward, carrying with it the indicator $g$, which, by its coaction with scale $h$, shows at all times the exact amount of material (i. e., the exact number of grammes) which must be added to or removed from, the mass of material on the platform to bring such mass to the precise amount for which the scale has been set. Thus, if the quantity of material on the platform is in excess of the amount to be weighed, the pointer $g$ will move above the zero mark and will indicate the exact amount by which the desired weight is exceeded and which must, therefore, be removed; and similarly, if the quantity falls short of the desired weight, the pointer will not move entirely up to the zero mark, but will stop short thereof, thus indicating the precise shortage.

I claim as my invention:—

1. A scale, comprising in combination, a beam; a receiving element for the material to be weighed; a lever system connecting the beam and receiving element to operate the former in accordance with the movements of the latter; an indicator system for setting the scale to weigh different definite amounts and including at least one weight adjustable along the beam in accordance with the particular amount to be weighed, an indicator arm connected to the weight to be shifted thereby, and a graduated scale member with which the indicator arm coacts; and a separate indicating device embodying an indicator arm connected to be shifted by the beam during the movements thereof, and a graduated scale member with which the last-named indicator arm coacts to indicate the precise difference in weight between the material on the receiving element and the amount for which the indicator system has been set.

2. A scale, comprising, in combination, a platform; a lever disposed therebeneath and having a suspension mounting at one end; a beam fulcrumed intermediate its ends; a suspension connection between the other end of said lever and the adjacent end of said beam; means on said platform bearing upon said lever intermediate the ends of the latter to depress the beam in accordance with the weight of material on the platform; a weight slidable along the beam; an indicator arm connected to said weight; a graduated scale member with which said arm coacts; a separate indicator arm connected to the free end of the beam to be shifted by the rocking movements of said beam; and a separate graduated scale member with which the last-named indicator arm coacts.

In testimony whereof I affix my signature.

CARLOS LUIS TOMÁS ABÁLSAMO.